United States Patent
Park et al.

(10) Patent No.: US 9,389,881 B2
(45) Date of Patent: Jul. 12, 2016

(54) METHOD AND APPARATUS FOR GENERATING COMBINED USER INTERFACE FROM A PLURALITY OF SERVERS TO ENABLE USER DEVICE CONTROL

(75) Inventors: Ho-Yeon Park, Seoul (KR); Young-sun Ryu, Gyeonggi-do (KR); Kyung-mo Park, Seoul (KR); Seong-ho Cho, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 502 days.

(21) Appl. No.: 12/382,361

(22) Filed: Mar. 13, 2009

(65) Prior Publication Data

US 2009/0265645 A1 Oct. 22, 2009

Related U.S. Application Data

(60) Provisional application No. 61/045,787, filed on Apr. 17, 2008.

(30) Foreign Application Priority Data

Aug. 12, 2008 (KR) .................. 10-2008-0079034

(51) Int. Cl.
*G06F 15/16* (2006.01)
*G06F 9/44* (2006.01)
*G06F 17/30* (2006.01)

(52) U.S. Cl.
CPC ........ *G06F 9/4445* (2013.01); *G06F 17/30899* (2013.01); *G06F 17/30905* (2013.01)

(58) Field of Classification Search
CPC .................. G06F 17/30899; G06F 17/30905
USPC .......... 709/203; 715/234, 512, 734, 751, 760, 715/825; 725/37; 386/95
See application file for complete search history.

(56) References Cited

U.S. PATENT DOCUMENTS

| | | | |
|---|---|---|---|
| 6,091,411 A | 7/2000 | Straub et al. | |
| 6,452,616 B1* | 9/2002 | De Vito et al. | ................ 715/825 |
| 6,476,828 B1 | 11/2002 | Burkett et al. | |
| 6,751,623 B1 | 6/2004 | Basso et al. | |
| 6,895,430 B1* | 5/2005 | Schneider | ......... H04L 29/12009 |
| | | | 707/999.005 |
| 7,197,715 B1 | 3/2007 | Valeria | |
| 7,212,212 B2 | 5/2007 | Cherdron | |

(Continued)

FOREIGN PATENT DOCUMENTS

| | | |
|---|---|---|
| CN | 1770721 | 5/2006 |
| CN | 1961281 | 5/2007 |

(Continued)

OTHER PUBLICATIONS

Verhoeven, R.; Dees, W.; , "Defining services for mobile terminals using remote user interfaces," Consumer Electronics, IEEE Transactions on , vol. 50, No. 2, pp. 535-542, May 2004.*

(Continued)

*Primary Examiner* — Imad Hussain
(74) *Attorney, Agent, or Firm* — Staas & Halsey LLP

(57) ABSTRACT

Provided are a method and apparatus for generating a user interface (UI). The method receives a plurality of UIs from a plurality of servers and generates and displays a combined UI by combining (or aggregating) the plurality of UIs, so that a user can control a plurality of devices through a client.

21 Claims, 7 Drawing Sheets

(56) References Cited

U.S. PATENT DOCUMENTS

| | | |
|---|---|---|
| 7,257,775 B1 | 8/2007 | Jivakov et al. |
| 7,346,689 B1 | 3/2008 | Northcutt et al. |
| 7,350,138 B1 | 3/2008 | Swaminathan et al. |
| 7,356,569 B1* | 4/2008 | Kembel ............ G06F 17/30899 707/E17.119 |
| 7,360,152 B2 | 4/2008 | Capps |
| 7,529,370 B1 | 5/2009 | Zhang et al. |
| 7,536,647 B2 | 5/2009 | Walker et al. |
| 7,546,522 B2 | 6/2009 | Toile et al. |
| 7,571,425 B2 | 8/2009 | Lessly |
| 7,590,947 B1 | 9/2009 | Gay |
| 7,644,367 B2 | 1/2010 | McKeon et al. |
| 7,660,416 B1 | 2/2010 | Kline |
| 7,734,999 B2 | 6/2010 | Leung et al. |
| 7,818,658 B2 | 10/2010 | Chen |
| 7,827,496 B2 | 11/2010 | Dorn et al. |
| 7,869,068 B2 | 1/2011 | Foehr et al. |
| 7,934,159 B1 | 4/2011 | Rahman et al. |
| 8,244,796 B1* | 8/2012 | James .................... G06Q 10/10 709/203 |
| 8,285,901 B2 | 10/2012 | Schubert et al. |
| 2001/0051998 A1* | 12/2001 | Henderson ............ G06Q 30/02 709/217 |
| 2002/0029296 A1* | 3/2002 | Anuff ............... G06F 17/30873 719/311 |
| 2002/0054165 A1 | 5/2002 | Negishi et al. |
| 2002/0059559 A1* | 5/2002 | Reddy ....................... G06F 8/38 717/109 |
| 2002/0070978 A1 | 6/2002 | Wishoff et al. |
| 2002/0105539 A1* | 8/2002 | Gamzon ........... G06F 17/30905 715/738 |
| 2002/0111995 A1* | 8/2002 | Mansour ............... G06F 9/4445 709/203 |
| 2002/0112058 A1 | 8/2002 | Weisman et al. |
| 2002/0116708 A1 | 8/2002 | Morris et al. |
| 2002/0120679 A1* | 8/2002 | Hayton .................... G06F 8/38 709/203 |
| 2002/0186664 A1 | 12/2002 | Gibson et al. |
| 2002/0191950 A1 | 12/2002 | Wang |
| 2002/0196912 A1 | 12/2002 | Norris |
| 2003/0001897 A1 | 1/2003 | Meandzija et al. |
| 2003/0004897 A1 | 1/2003 | Smith, IV |
| 2003/0030674 A1* | 2/2003 | Johnstone ................ G06F 8/38 715/781 |
| 2003/0117365 A1* | 6/2003 | Shteyn ................... G10L 15/26 345/156 |
| 2003/0151621 A1 | 8/2003 | McEvilly et al. |
| 2003/0195923 A1* | 10/2003 | Bloch .................... G06F 9/4443 709/203 |
| 2004/0001565 A1* | 1/2004 | Jones .................. H04L 67/1095 375/354 |
| 2004/0015981 A1* | 1/2004 | Coker ................... G06F 9/4443 719/320 |
| 2004/0066397 A1 | 4/2004 | Walker et al. |
| 2004/0148586 A1 | 7/2004 | Gilboa |
| 2004/0163046 A1* | 8/2004 | Chu .......................... H04L 67/36 715/251 |
| 2004/0193652 A1* | 9/2004 | Wendker ............. G06F 17/3056 |
| 2005/0010634 A1* | 1/2005 | Henderson ........ G06F 17/30873 709/201 |
| 2005/0010877 A1 | 1/2005 | Udler |
| 2005/0091584 A1 | 4/2005 | Bogdan |
| 2005/0101312 A1 | 5/2005 | Kang |
| 2005/0125560 A1* | 6/2005 | Brockway ........... H04L 63/0209 709/249 |
| 2005/0131911 A1* | 6/2005 | Chi .................... G06F 17/30905 |
| 2005/0149639 A1 | 7/2005 | Vrielink et al. |
| 2005/0192771 A1* | 9/2005 | Fischer .............. G06F 17/30905 702/122 |
| 2005/0256940 A1* | 11/2005 | Henderson ........ G06F 17/30902 709/219 |
| 2005/0257137 A1* | 11/2005 | Weber et al. .................. 715/512 |
| 2005/0267973 A1* | 12/2005 | Carlson ................. G06Q 30/06 709/228 |
| 2005/0278793 A1* | 12/2005 | Raley ..................... G06F 21/10 726/28 |
| 2005/0283798 A1* | 12/2005 | Hunleth ............... G06F 3/0481 725/37 |
| 2006/0041641 A1* | 2/2006 | Breiter ................. G06F 9/5072 709/219 |
| 2006/0094360 A1 | 5/2006 | Jung et al. |
| 2006/0156315 A1* | 7/2006 | Wood ..................... G06F 9/4443 719/328 |
| 2006/0174026 A1 | 8/2006 | Robinson et al. |
| 2006/0182092 A1 | 8/2006 | Kodaka |
| 2006/0212798 A1* | 9/2006 | Lection ..................... G06F 9/54 715/234 |
| 2006/0232573 A1 | 10/2006 | Nitta et al. |
| 2006/0236234 A1 | 10/2006 | Michelstein et al. |
| 2007/0033522 A1* | 2/2007 | Lin ........................ G06F 9/4443 715/202 |
| 2007/0150816 A1 | 6/2007 | Hariki |
| 2007/0214431 A1 | 9/2007 | Amadio et al. |
| 2007/0220392 A1 | 9/2007 | Bhaumik et al. |
| 2007/0282748 A1 | 12/2007 | Saint Clair et al. |
| 2007/0288636 A1* | 12/2007 | Rogers .................. H04W 28/06 709/226 |
| 2007/0294586 A1 | 12/2007 | Parvathy et al. |
| 2007/0294674 A1 | 12/2007 | Marilly et al. |
| 2008/0016151 A1* | 1/2008 | Howard .............. G06F 17/3089 709/203 |
| 2008/0034289 A1* | 2/2008 | Doepke ................ G06F 3/04812 715/700 |
| 2008/0082603 A1 | 4/2008 | Mansour et al. |
| 2008/0122847 A1 | 5/2008 | Takano et al. |
| 2008/0127060 A1 | 5/2008 | Reamey |
| 2008/0127133 A1* | 5/2008 | Aghara ................ G06F 17/3089 717/140 |
| 2008/0155062 A1 | 6/2008 | Rabold et al. |
| 2008/0155617 A1 | 6/2008 | Angiolillo et al. |
| 2008/0193109 A1 | 8/2008 | Kakumu et al. |
| 2008/0212937 A1 | 9/2008 | Son |
| 2008/0240669 A1 | 10/2008 | Oh et al. |
| 2008/0243998 A1 | 10/2008 | Oh et al. |
| 2008/0282172 A1* | 11/2008 | Bayang ................. G06F 9/4443 715/744 |
| 2008/0285949 A1* | 11/2008 | Weber ............................ 386/95 |
| 2008/0288866 A1 | 11/2008 | Spencer et al. |
| 2008/0301628 A1* | 12/2008 | Lochmann .............. G06F 8/10 717/107 |
| 2008/0313648 A1* | 12/2008 | Wang ..................... G06F 21/53 719/315 |
| 2009/0006979 A1* | 1/2009 | Callanan et al. .............. 715/751 |
| 2009/0006985 A1* | 1/2009 | Fong ..................... G06Q 40/02 715/760 |
| 2009/0037396 A1* | 2/2009 | Uematsu et al. .................. 707/4 |
| 2009/0125582 A1* | 5/2009 | Marcus ................. H04N 7/17318 709/203 |
| 2009/0144640 A1* | 6/2009 | Schneider ......... G06F 17/30905 715/760 |
| 2009/0204885 A1* | 8/2009 | Ellsworth et al. ............. 715/234 |
| 2009/0265422 A1* | 10/2009 | Park et al. ..................... 709/203 |
| 2009/0300478 A1* | 12/2009 | Kondo ........................... 715/234 |
| 2010/0023865 A1* | 1/2010 | Fulker et al. .................. 715/734 |
| 2010/0042678 A1 | 2/2010 | Park et al. |
| 2010/0058220 A1 | 3/2010 | Carpenter |
| 2010/0241963 A1 | 9/2010 | Kulis et al. |
| 2010/0281545 A1 | 11/2010 | Levy |
| 2010/0295770 A1 | 11/2010 | Shim |
| 2010/0332565 A1 | 12/2010 | Al-Shaykh et al. |
| 2010/0332993 A1 | 12/2010 | Bousseton et al. |
| 2011/0072374 A1 | 3/2011 | Kunz et al. |
| 2011/0202842 A1 | 8/2011 | Weatherly et al. |
| 2011/0289412 A1 | 11/2011 | Sokol et al. |
| 2012/0054602 A1 | 3/2012 | Demant et al. |
| 2012/0204115 A1 | 8/2012 | Barrett |

FOREIGN PATENT DOCUMENTS

| | | |
|---|---|---|
| EP | 1187000 | 3/2002 |
| EP | 1253750 | 10/2002 |
| EP | 2143297 | 1/2010 |
| KR | 2002-0048188 | 6/2002 |

(56) References Cited

FOREIGN PATENT DOCUMENTS

| KR | 2003-0071289 | 9/2003 |
|---|---|---|
| KR | 10-2005-0072069 | 7/2005 |
| KR | 10-2006-0001550 | 1/2006 |
| KR | 10-2006-0105813 | 10/2006 |
| KR | 10-2007-0005987 | 1/2007 |
| KR | 10-2007-0074037 | 7/2007 |
| KR | 10-2008-0018061 | 2/2008 |
| KR | 10-2008-0089134 | 10/2008 |
| KR | 10-2008-00809119 | 10/2008 |
| KR | 10-2010-0020310 | 2/2010 |
| WO | 02/082814 A2 | 10/2002 |
| WO | 2008/023940 A1 | 2/2008 |
| WO | 2008/120890 A1 | 10/2008 |

OTHER PUBLICATIONS

Lowet et al. "Content Sharing and Experience Sharing with Web4CE." Philips Research Laboratories, Mar. 2008.*
International Search Report and Written Opinion mailed Nov. 27, 2009 and issued in corresponding International Patent Application PCT/KR2009/01994.
European Search Report dated May 2, 2011 in corresponding European Patent Application 09732983.3.
U.S. Appl. No. 12/382,362, filed Mar. 13, 2009, Ho-yeon Park et al., Samsung Electronics Co. Ltd.
U.S. Appl. No. 12/423,992, filed Apr. 15, 2009, Ho-yeon Park et al., Samsung Electronics Co Ltd.
Chinese Office Action mailed Feb. 5, 2013 for corresponding Chinese Application No. 200980113591.0.
Chinese Decision of Rejection mailed Mar. 7, 2013 for corresponding Chinese Application No. 200980113927.3.
Chinese Office Action issued Feb. 6, 2012 in corresponding Chinese Patent Application No. 200980113591.0.
Chinese Office Action issued Feb. 13, 2012 in corresponding Chinese Patent Application No. 200980113927.3.
Chinese Office Action issued Apr. 18, 2012 in corresponding Chinese Patent Application No. 200980113575.1.
Extended European Search Report issued Dec. 6, 2012 in corresponding European Patent Application No. 09731533.7.
Extended European Search Report issued Dec. 12, 2012 in corresponding European Patent Application No. 09731966.9.
Extended European Search Report issued Dec. 14, 2012 in corresponding European Patent Application No. 09732302.6.
Second Chinese Office Action issued Nov. 19, 2012 in corresponding Chinese Patent Application No. 200980113575.1.
Third Chinese Office Action issued Oct. 26, 2012 in corresponding Chinese Patent Application No. 200980113591.0.
Third Chinese Office Action issued Oct. 26, 2012 in corresponding Chinese Patent Application No. 200980113927.3.
"Web-based Protocol and Framework for Remote User Interface on UPnP Networks and the Internet (Web4CE)", CEA Standard, Jul. 2007, 176 pages.
Korean Office Action dated Dec. 30, 2014 from Korean Patent Application No. 10-2008-0079032, 10 pages.
Korean Office Action dated Jan. 19, 2015 from Korean Patent Application No. 10-2008-0079036, 12 pages.
Chinese Office Action mailed May 16, 2013 in corresponding Chinese Application No. 200980113575.1.
Chinese Office Action mailed Nov. 8, 2013 in corresponding Chinese Application No. 200980113575.1.
Chinese Office Action mailed Aug. 22, 2013 in corresponding Chinese Application No. 200980113591.0.
European Office Action dated Aug. 21, 2015 in European Patent Application No. 09732983.3.
Chinese Office Action dated Sep. 7, 2015 in Chinese Patent Application No. 200980113927.3.
International Search Report issued Dec. 8, 2009 in corresponding International Patent Application PCT/KR2009/001951.
International Search Report issued Dec. 7, 2009 in corresponding International Patent Application PCT/KR2009/001952.
US Office Action dated Jan. 12, 2015 in U.S. Appl. No. 12/382,362.
US Office Action dated May 22, 2014 in U.S. Appl. No. 12/382,362.
US Office Action dated Aug. 4, 2014 in U.S. Appl. No. 12/382,362.
US Office Action dated Mar. 21, 2013 in U.S. Appl. No. 12/382,362.
US Office Action dated Nov. 6, 2013 in U.S. Appl. No. 12/382,362.
US Office Action dated Oct. 24, 2012 in U.S. Appl. No. 12/382,362.
US Office Action dated Apr. 15, 2011 in U.S. Appl. No. 12/382,362.
US Office Action dated Oct. 21, 2011 in U.S. Appl. No. 12/382,362.
US Notice of Allowance dated Mar. 13, 2015 in U.S. Appl. No. 12/423,992.
US Office Action dated May 16, 2014 in U.S. Appl. No. 12/423,992.
US Office Action dated Oct. 1, 2014 in U.S. Appl. No. 12/423,992.
Advisory Action dated Apr. 12, 2013 in U.S. Appl. No. 12/423,992.
US Office Action dated Jan. 30, 2013 in U.S. Appl. No. 12/423,992.
US Office Action dated Oct. 2, 2012 in U.S. Appl. No. 12/423,992.
US Office Action dated Jan. 24, 2011 in U.S. Appl. No. 12/423,992.
US Office Action dated Aug. 31, 2011 in U.S. Appl. No. 12/423,992.
US Advisory Action dated Dec. 7, 2011 in U.S. Appl. No. 12/423,992.
US Office Action dated Oct. 8, 2015 in U.S. Appl. No. 12/385,317.
US Advisory Action dated Jun. 11, 2015 in U.S. Appl. No. 12/385,317.
US Office Action dated Mar. 19, 2015 in U.S. Appl. No. 12/385,317.
US Office Action dated Sep. 18, 2014 in U.S. Appl. No. 12/385,317.
US Advisory Action dated Feb. 17, 2012 in U.S. Appl. No. 12/385,317.
US Advisory Action dated Nov. 1, 2012 in U.S. Appl. No. 12/385,317.
US Office Action dated Aug. 27, 2012 in U.S. Appl. No. 12/385,317.
US Office Action dated Mar. 29, 2012 in U.S. Appl. No. 12/385,317.
US Office Action dated Jul. 11, 2011 in U.S. Appl. No. 12/385,317.
US Office Action dated Dec. 13, 2011 in U.S. Appl. No. 12/385,317.
Chinese Office Action dated Dec. 22, 2015 in Chinese Patent Application No. 200980113591.0.
KyungMo Stanley Park, "LASeR in Home" International Organisation For Standardisation, ISO/IEC JTC1/SC29/WG11, Coding of Moving Pictures and Audio, Apr. 2008, 4 pages.
KyungMo Stanley Park, "Use cases and requirement for an MPEG User Interface Framework" International Organisation For Standardisation, ISO/IEC JTC1/SC29/WG11, Coding of Moving Pictures and Audio, Apr. 2008, 6 pages.
Seongho Cho, "Use cases and requirement of a personalized User Interface for LASeR" International Organisation For Standardisation, ISO/IEC JTC1/SC29/WG11, Coding of Moving Pictures and Audio, Apr. 2008, 3 pages.
US Notice of Allowance dated Apr. 25, 2016 in U.S. Appl. No. 12/385,317.
Chinese Office Action dated Apr. 29, 2016 in Chinese Patent Application No. 200980113591.0.
Chinese Office Action dated Apr. 11, 2016 in Chinese Patent Application No. 200980113927.3.

* cited by examiner

METHOD AND APPARATUS FOR GENERATING COMBINED USER INTERFACE FROM A PLURALITY OF SERVERS TO ENABLE USER DEVICE CONTROL

CROSS-REFERENCE TO RELATED APPLICATIONS

This application claims the benefit of U.S. Provisional Patent Application No. 61/045,787, filed on Apr. 17, 2008, in the U.S. Patent and Trademark Office, and the benefit of Koran Patent Application No. 10-2008-0079034, filed on Aug. 12, 2008, in the Korean Intellectual Property Office, the disclosures of which are incorporated herein in their entirety by reference.

BACKGROUND

1. Field

An embodiment or embodiments relate to a method and apparatus for generating a user interface (UI), and more particularly, to a method and apparatus for dynamically generating a UI by a client connected to a plurality of servers.

2. Description of the Related Art

A variety of types of multimedia devices has been developed and an accelerated convergence has occurred therebetween. Different types of multimedia devices are frequently used to configure a network and communicate multimedia data, or control each other.

Multimedia devices that are located physically apart from each other are remotely controlled via a remote user interface (RUI). A user interface (UI) server provides a UI client with a control UI. The UI client controls the UI server via the control UI. For example, the UI server provides the UI client with a remote control UI in the form of a web page. The UI client displays the web page through a browser. Thereafter, a client user controls the UI server through the displayed UI.

SUMMARY

Additional aspects and/or advantages will be set forth in part in the description which follows and, in part, will be apparent from the description, or may be learned by practice of the invention.

Embodiments provide a method and apparatus for generating a user interface (UI) of a UI client, and a computer readable recording medium having recorded thereon a program for executing the method.

According to an aspect of the embodiment, a method of generating a user interface (UI), the method including: receiving a plurality of UIs (from at least two servers); and generating a combined UI by combining (or aggregating) the plurality of UIs is provided.

The plurality of UIs received from the at least two servers may be encoded in a multimedia data format by using an MPEG scene-description technology.

The plurality of UIs (received from the at least two servers) may include information used to present objects included in the at least two UIs, information about events generated by the objects, and information about functions called to process the events.

The generating of the combined UI may include: decoding the plurality of UIs that are encoded in the multimedia data format; analyzing the information used to present objects included in the at least two UIs, the information about events generated by the objects, and the information about functions called to process the events with regard to the plurality of decoded UIs; and generating the combined UI by combining (or aggregating) the plurality of UIs based on a result of the analyzing.

The generating of the combined UI by aggregating (combining) the plurality of UIs based on the result of the analyzing may include: generating the combined UI by disposing the plurality of UIs based on the information used to present the objects.

The generating of the combined UI by combining (or aggregating) the plurality of UIs based on the result of the analyzing may include: generating the combined UI so as to generate a combined event by combining at least two events of the plurality of UIs based on the information about the events and the information about the functions.

The generating of the combined UI by combining (or aggregating) the plurality of UIs based on the result of the analyzing may include: generating the combined UI so as to generate a combined event related to at least one of the events of the plurality of UIs based on the information about the events and the information about the functions.

According to another aspect of the embodiment, there is provided an apparatus for generating a UI, the apparatus including: a connecting unit receiving a plurality of UIs (from at least two servers); and a UI generating unit generating a combined UI by combining (or aggregating) the plurality of UIs (received from the at least two servers) is provided.

According to another aspect of the embodiment, a computer readable recording medium having recorded thereon a program for executing the above-described method is provided.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
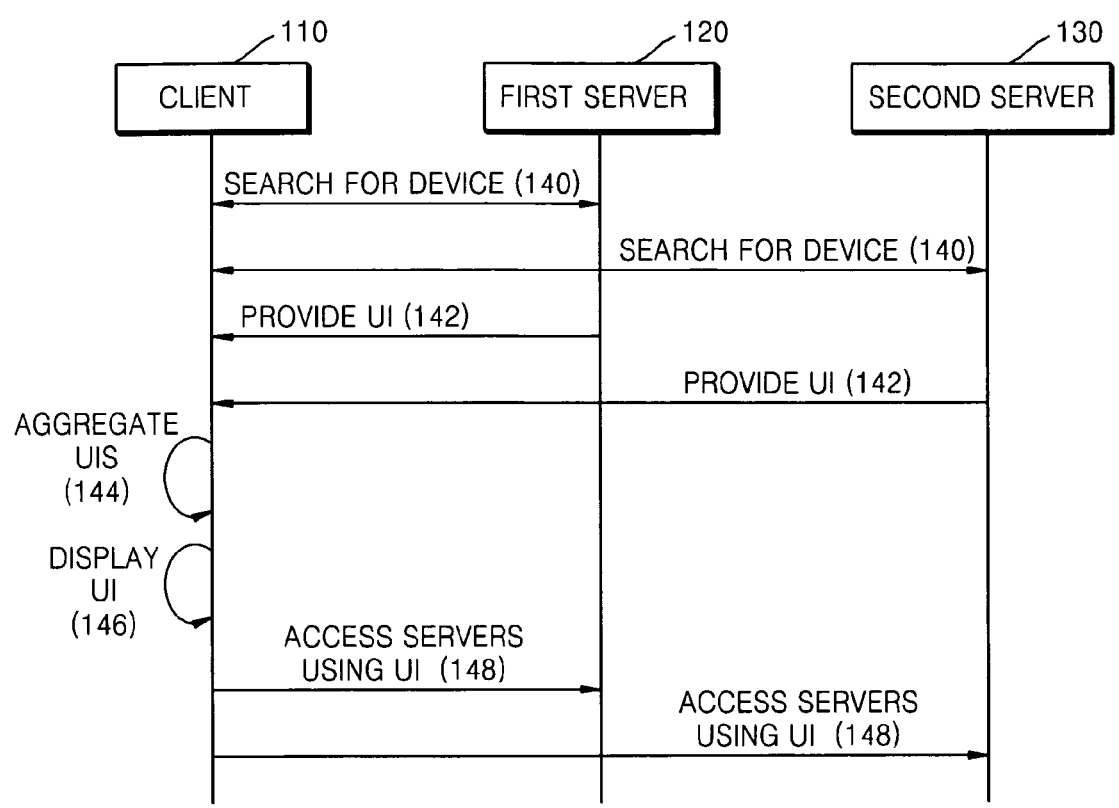
FIG. 1 is a data flow diagram of a method of providing and receiving a user interface (UI) according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a data flow diagram of a method of providing and receiving a user interface (UI) according to an embodiment. Referring to FIG. 1, a first server 120 and a second server 130 provide a client 110 with the UI. However, the first server 120 and the second server 130 are just exemplary servers. Three or more servers may provide the client 110 with the UI.

In operation 140, the client 110 discovers the first server 120 and the second server 130. The client 110 that is a UI client discovers the first server 120 and the second server 130 that are UI servers via a predetermined network. For example, if the client 110, the first server 120, and the second server 130 are all devices of a universal plug and play (UPnP) network, the client 110 discovers the first server 120 and the second server 130 that are UI servers through a control point (CP).

In operation 142, the first server 120 and the second server 130 provide the client 110 with the UIs. The first server 120 and the second server 130 provide the client 110 with the UIs necessary for accessing the first server 120 and the second server 130, respectively. The UIs provided to the client 110 may be widgets.

The UIs provided by the first server 120 and the second server 130 may be encoded in a multimedia data format. If the first server 120 and the second server 130 generate the UIs in the form of the web page and provide the client 110 with the UIs as in the related art, it may be limited to express the UIs. In more detail, the UIs may not be expressed in the form of various media. Also, the client 110 needs to include a separate software or hardware module so as to express the UIs such as a web browser. If the client 110 is a device having limited available hardware resources such as a mobile device, it is not appropriate for expressing UIs.

Therefore, the first server 120 and the second server 130 encode information about at least one UI in the multimedia data format in operation 142. Since most devices including the mobile device can reproduce multimedia including video, voice, etc., the first server 120 and the second server 130 encode the UIs in the multimedia data format.

For example, the first server 120 and the second server 130 may encode the UI based on the Moving Picture Experts Group (MPEG) standard. The MPEG standard, which is an international standard for the compression encoding of video and audio, includes various versions of MPEG-1, MPEG-2, MPEG-4, MPEG-7, and MPEG-21. The first server 120 and the second server 130 generate the UIs by using the MPEG standards. For example, the first server 120 and the second server 130 encode the UIs in a video format to allow the client 110 to reproduce the encoded UI, thereby solving a compatibility problem due to a difference in the performance of the devices.

In particular, an object-based multimedia encoding method such as the MPEG, binary format for scene (BIFS) and the lightweight applications scene representation (LASeR) may be used to encode the UIs. Objects included in the UIs are encoded based on the BIFS format or the LASeR format, and a scene-description technology of the BIFS or the LASeR is used to express temporal and spatial arrangement of the UI objects and encode the UIs.

The BIFS or the LASeR includes information on the scene-description technology used to express temporal and spatial arrangement of the UI objects included in an image. Therefore, the BIFS or the LASeR is used to express temporal and spatial arrangement of the UI objects such as a button, a menu, etc.

A scene-description language, such as the BIFS or the LASeR, is used to encode the UIs and generate multimedia data including the image with regard to the UIs, such as an AV stream. The client 110 reproduces a received AV stream to display the UIs.

Since the reproduction of the AV stream enables the UIs to be displayed, most devices for reproducing the AV stream can display the UIs provided by the first server 120 and the second server 130.

The UIs may be encoded in the form of a UI package that is an easy hierarchical conversion of the UIs. This will be described in more detail with reference to FIGS. 2 and 3.

Figure 2:
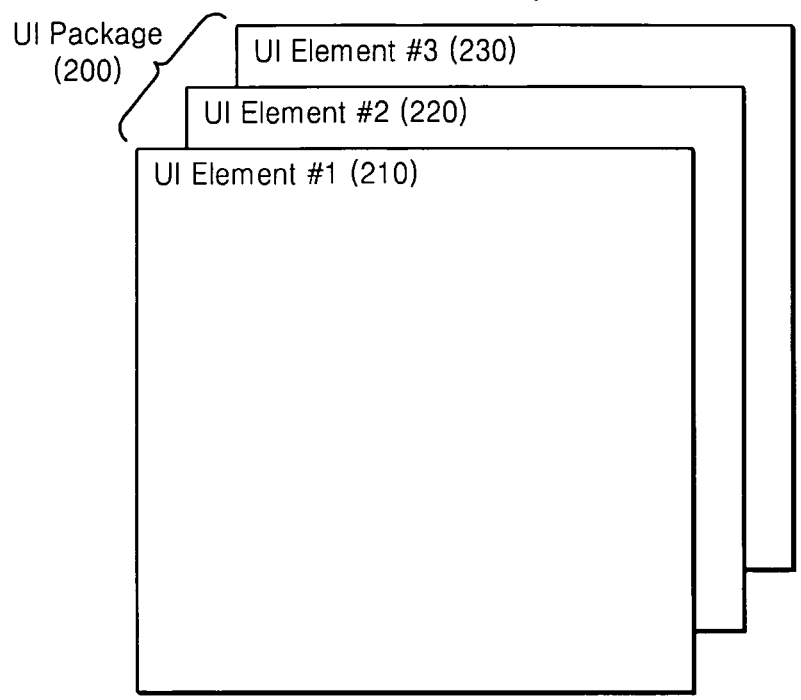
FIG. 2 illustrates a UI package according to an embodiment of the present invention.

FIG. 2 illustrates a UI package 200 according to an embodiment. Referring to FIG. 2, the first server 120 and/or the second server 130 encodes a UI in the form of the UI package 200 and provides the client 110 with the UI. The UI package 200 includes a plurality of UIs, i.e., a plurality of UI elements 210 through 230.

Each of the UI elements 210 through 230 includes at least one UI object. The UI object which generates a predetermined event refers to a minimum unit of a UI for calling a predetermined function.

The UI package 200 including information about the plurality of UIs, i.e., the plurality of UI elements, may include information about the UIs that are continuously displayed on the client 110 according to a user's selection of a predetermined object from the UIs.

For example, an initial UI displaying information about movies selected by a user in the form of thumbnails may be stored in the UI element #1 210. When the user selects one of the movies from the initial UI, the UI controlling the reproduction of the selected movie may be stored in the UI element #2 220.

Further, the information about the plurality of UIs may be information used to display a UI of a server on a plurality of different clients. When the plurality of different clients receives the UIs from the server via a network, the different clients may have a different capability. The plurality of different clients may be different from each other in terms of a resolution of a display device, a memory, a CPU, and the like, or any combination thereof. Therefore, the information about the plurality of UIs that can be displayed on the plurality of different clients may be included in the UI package 200.

For example, when the first server 120 is an IP-set-top box that is connected to a digital TV, a computer, a portable media player (PMP), and the like via the network, the digital TV, the computer, and the PMP may be different from each other in terms of the resolution of the display device and hardware performance. Therefore, the UI element #1 210 may include information about the UI that can be displayed on the digital TV. The UI element #2 220 may include information about the UI that can be displayed on the computer. The UI element #3 230 may include information about the UI that can be displayed on the PMP. Thereafter, the UI package 200 is provided to all kinds of clients so that each client selects one of the UIs and displays the selected UI. When the client 110 is the digital TV, the client 110 selects and displays the UI element including the information about the UI of the digital TV.

Although the performance of the client 110 is described, the network environment and preference of the client 110 may be the standard for selecting one UI from the UI package 200. A bandwidth of a network to which the client 110 is connected and a user's personal profile of the client 110 may be the standard for selecting the UI. The personal profile may include a user's age, nationality, available language, etc. Such information about the user's preferences may include information generated by the MPEG-21 standard's usage environment description (UED) or W3C composite capabilities/preference profile (CC/PP).

Further, the information about the plurality of UIs may be information used to display the UIs in a progressive manner. For example, the UI element #1 210 may include some objects of the UIs, and the UI element #2 220 may include other objects thereof.

Figure 3:
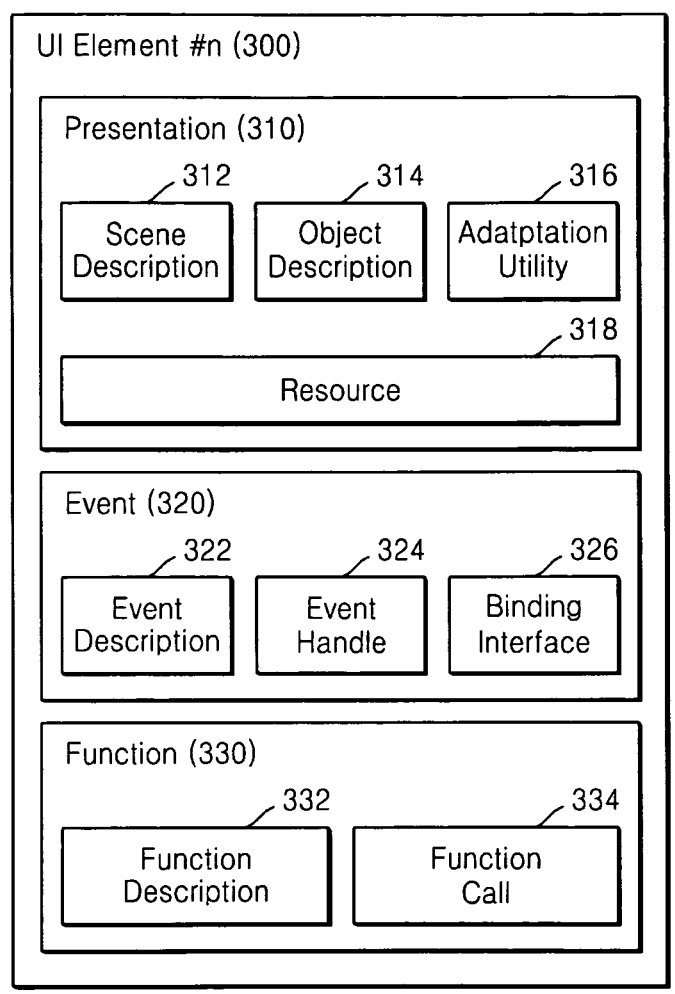
FIG. 3 is a block diagram of a UI element according to an embodiment

FIG. 3 is a block diagram of a UI element 300 according to an embodiment. Referring to FIG. 3, the UI element 300 includes information about objects included in a UI, information about events generated by the objects, and information about a function called to process the events.

The UI element 210, 220, or 230 may include hierarchical information about presentation, events, and/or function, thereby dynamically extending the UI by using convergence of the presentation, events, and/or function.

The UI element 300 includes information 310 used to present the objects included in a UI scene, information 320 about the events generated by the objects, and information 330 about the function called to process the events.

The information 310 used to present the objects included in the UI is information on how to arrange the objects included in the UI, which media is used to present the objects, and which type is used to present the objects.

A "scene description" 312 may include information used to describe a structure of the UI. The "scene description" 312 may include information about locations of the objects disposed in the UI to describe a scene layout, a scene form, a scene theme, and/or a scene template, etc. The "scene description" 312 may include information about how to present the UI. When the UI is presented by using special effects such as fade-out and fade-in, the "scene description" 312 may include information on the special effects.

An "object description" 314 includes information regarding how to present each object. The "object description" 314 describes information regarding which media is used to present each object among image, video, and/or audio. Also, when the objects included in the UI are presented at a different time, the "object description" 314 may describe information about time for adjusting timing. Also, when the objects are included in a scene by using the special effects, the "object description" 314 may include information about how to present the objects. When the objects are presented by using the fade-out or the fade-in effect, the "object description" 314 may include information on the fade-out or the fade-in effect. When animation effects that do not fix the size or shape of the objects are applied to the objects, the "object description" 314 may include information about the animation effects.

An "adaptation utility" 316 includes information about a dynamic configuration of the UI. For example, although the UI includes UI objects A, B, C, and D, (not shown) when the client 110 presents the UI objects A and B in a UI scene in terms of its performance, the "adaptation utility" 316 includes information about the dynamic configuration of the UI. The "adaptation utility" 316 includes information about the performance of the client 110 and the standard for dynamically configuring the UI. For example, the "adaptation utility" 316 may include information about the standard for a client having the display performance of a standard definition (SD) device that presents the UI objects A and B, and another client having the display performance of a high definition (HD) device that presents the UI objects A, B, C, and D (not shown). Although the performance of the client 110 that is the standard for the dynamic configuration is described, the individual characteristics of the client 110 such as the network environment or the preference of the client 110 may be the standard for the dynamic configuration.

The "adaptation utility" 316 may include information about the standard for selecting a UI element. As described above, the UI package 200 includes information about a plurality of UIs for displaying the UIs on a plurality of different clients.

Therefore, the plurality of different clients need selection reference information used to select and display the UI element 210, 220, or 230 from the UI package 200. The "adaptation utility" 316 may include the selection reference information. For example, if the "adaptation utility" 316 includes information about the minimum performance used to display each of the UI element 210, 220 and 230, the client 110 refers to the information and selects the UI element 210, 220, and 230 that can be displayed on the client 110 from the UI package 200.

A "resource" 318 includes sources of the UI. The "resource" 318 may includes multimedia data such as image, video, and/or audio.

The information 320 is information about the events generated by the objects included in the UI. The information 320 includes information about the events generated according to interactions with the user such as a user's object selection.

An "event description" 322 includes information about the events generated by the objects. The "event description" 322 describes types of user interactions that can be performed through the UI objects such as a click, a touch, a rotation, and the like.

An "event handle" 324 includes information about how to process the generated events. For example, if an event is defined as a click of a predetermined UI object, the "event handle" 324 defines an operation that is to be performed according to the click event. If the clicked UI object is an object for adjusting volume, the "event handle" 324 includes information used to connect the click event to a volume-up operation or a volume-down operation.

A "binding interface" 326 includes information about mapping defined events to device application program interfaces (APIs) that are called to process the events. The "binding interface" 326 includes information about the events generated by the UI objects and the mapping of the events to the called device APIs so as to connect functions called by the events.

The information 330 about the function called to process the events includes detailed information about the device APIs that are called to perform the functions.

A "function description" 332 includes information about detailed operations of the device APIs that are called by the events, i.e., information about specific functions that are realized by the user through the device APIs. For example, when a device API regarding a vibration function is called, the "function description" 332 includes information about specific functions such as functions of adjusting a vibration intensity and a vibration time that can be realized with vibration.

A "function invocation" 334 includes information about a specific parameter having a function that is called by the UI object. For example, if the device API having the vibration function of adjusting five levels of the vibration intensity and the vibration time is described in the "function description" 332, the "function invocation" 334 includes parameters indicating a level of the five levels of the vibration intensity and the vibration time used to call the function. In more detail, the "function invocation" 334 describes that the UI object A uses the third level of the vibration intensity and the first level of the vibration time to call the vibration function among the five levels of the vibration intensity and the vibration time described in the "function description" 332.

Referring to FIG. 1, in operation 144, the client 110 combines (or aggregates) the UIs received from the first server 120 and the second server 130 and generates a combined UI.

The client 110 decodes the UIs received from the first server 120 and the second server 130, combines (or aggregates) the decoded UIs, and generates a new UI (combined UI).

The combination or aggregation of the UIs may be various combinations or aggregations, for example a presentation aggregation, an event aggregation, etc., or any combination thereof This will be in more detail described in more detail with reference to FIGS. 4A-4D, 5A, 5B, and 6.

Figure 4A:
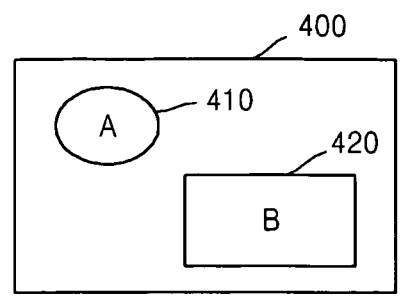
FIGS. 4A through 4D illustrate a presentation combination (or aggregation) of UIs according to an embodiment.
Figure 4B:
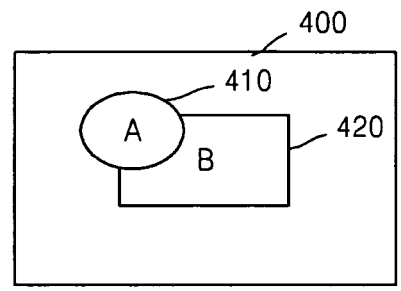
Figure 4C:
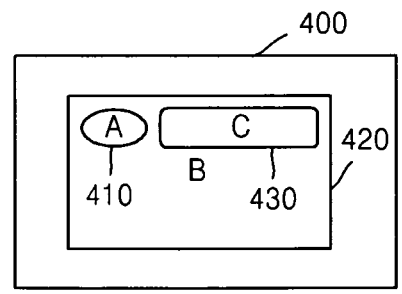
Figure 4D:
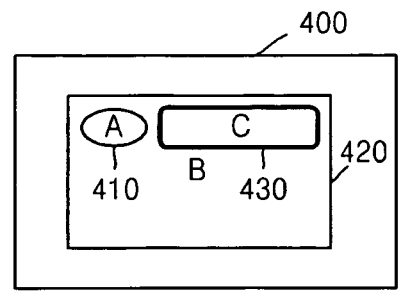

FIGS. 4A through 4D illustrate a presentation aggregation of UIs according to an embodiment of the present invention. Referring to FIGS. 4A through 4D, the client 110 combines (or aggregates) presentation of UIs received from a plurality of servers. Referring to FIGS. 4A and 4B, the client 110 combines (or aggregates) presentation of UIs received from two servers. Referring to FIGS. 4C and 4D, the client 110 combines (or aggregates) UIs received from three servers, i.e., a UI A 41 received from the first server 120, a UI B 420 received from the second server 130, and a UI C 430 received from a third server (not shown) and displays the aggregated UIs on a screen.

Referring to FIG. 4A, the client 110 aggregates the UIs A 410 and B 420 and generates a combined UI so that the UI A 410 received from the first server 120 is disposed on a left upper end of a screen 400 and the UI B 420 received from the second server 130 is disposed on a right lower end of the screen 400.

The client 110 analyzes a UI element received from the first server 120 and a UI element received from the second server 130, and corrects and combines (or aggregates) the information 310 used to present the objects included in each UI, i.e., the scene description 312 and the object description 314. The client 110 generates a combined UI element, and displays a UI according to the combined UI element.

Referring to FIG. 4B, the UI A of the first server 120 and the UI B of the second server 130 overlap and are displayed on the screen 400.

Referring to FIG. 4C, the UI A 410 of the first server 120 and the UI C 430 of the third server (not shown) are embedded in the UI B 420 of the second server 130 and displayed on the screen 400. As described with reference to FIG. 4A, the client 110 analyzes the UI element received from each server, and corrects and combines (or aggregates) the information 310 used to present the objects included in each UI element to aggregate the UIs.

Referring to FIG. 4D, as shown in FIG. 4C, the UI A 410 of the first server 120 and the UI C of the third server (not shown) are embedded in the UI B 420 of the second server 130 and displayed on the screen 400. However, the UI C 430 of the third server (not shown) is highlighted and displayed on the screen 400. The client 110 may separately define a highlighting time and/or a highlighting order of the UIs to combine (or aggregate) the UIs.

In addition to the embodiments described with reference to FIGS. 4A through 4D, the client 110 may combine or (aggregate) objects included in the UI A of the first server 120 and objects included in the UI B 420 of the second server 130 to generate a new UI (not shown). For example, the client 110 may aggregate some UI objects included in the UI A 410 and some UI objects included in the UI B 420 to generate a combined UI (not shown).

Figure 5A:
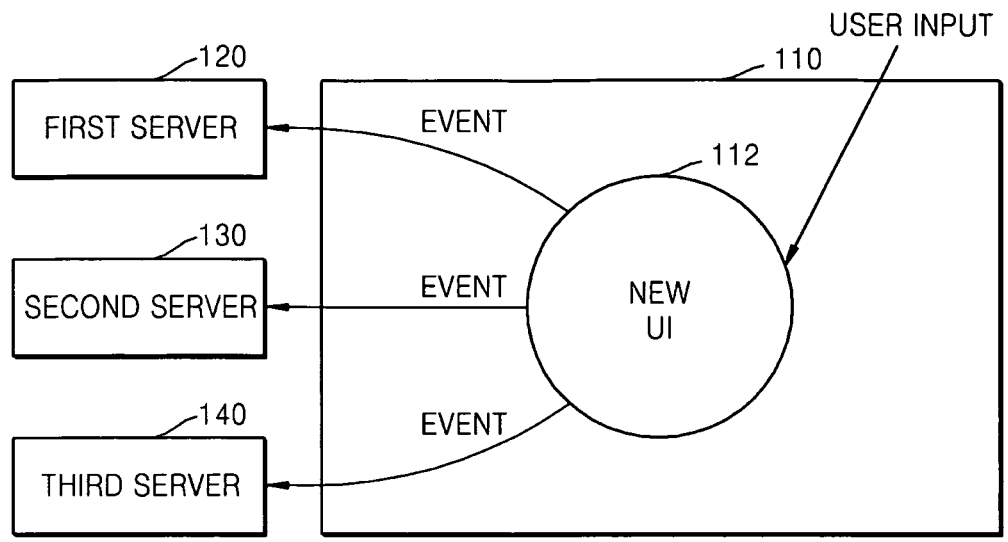
FIGS. 5A and 5B illustrate an event combination (or aggregation) of UIs according to an embodiment.
Figure 5B:
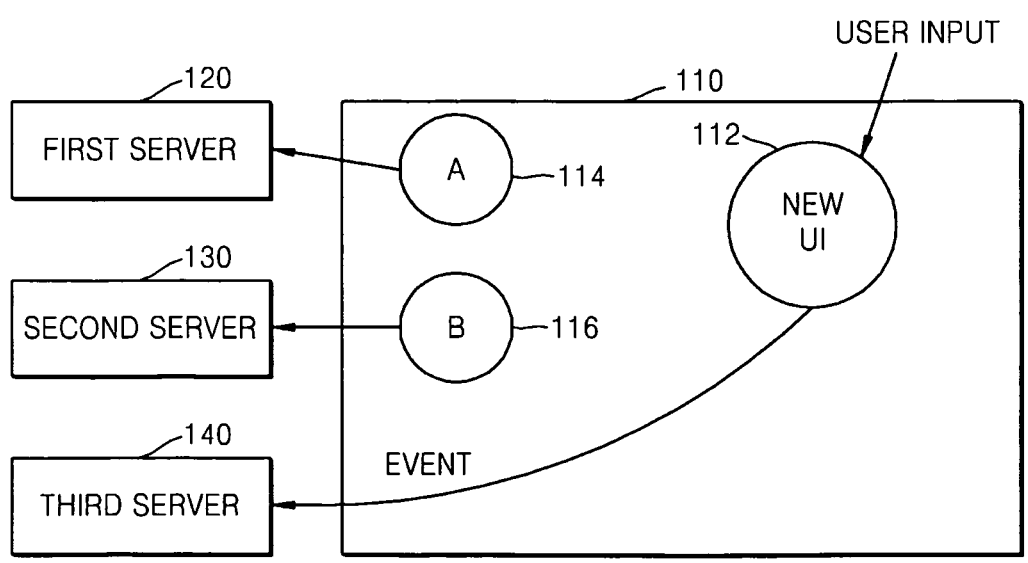

FIGS. 5A and 5B illustrate an event aggregation of UIs according to an embodiment. The client 110 may generate a new UI that generates a plurality of events in operation 144.

Referring to FIG. 5A, the client 110 may generate a combined UI 112 that generates a plurality of events when aggregating the UIs of the first server 120 and the second server 130 in operation 144.

The client 110 may combine (or aggregate) the UIs provided by the first server 120 and the second server 130 based on information about events included in UI elements and information about functions and generate the combined UI (new UI) 112 that simultaneously generates the events with regard to the first server 120 and the second server 130. Also, the combined UI 112 may generate the events with regard to the first server 120 and the second server 130 and an event with regard to a third server 140.

For example, if the first server 120 is a DVD player, and the second server 130 is an AV receiver of a home theater, the client 110 that is a digital TV may combine or aggregate the UIs of the first server 120 and the second server 130 and generate the combined UI 112 regarding the "DVD reproduction". If a user clicks the combined UI 112 regarding the "DVD reproduction", a DVD reproduction event with regard to the first server 120 is generated, and an event for reproducing an AV signal with regard to the second server 130 is generated. In more detail, the user selects the combined UI 112 regarding the "DVD reproduction" to simultaneously control the home theater and the DVD player. The user may listen to a DVD sound through the home theater while viewing DVD video on the digital TV.

Another device can be controlled simultaneously with the controlling of the DVD player and the AV receiver. For example, if the third server 140 is lighting in a living room, the combined UI 112 may generate an event for adjusting the lighting in the living room. The event with regard to the third server 140 is generated so that the lighting in the living room becomes dark simultaneously when the user clicks the combined UI (new UI) 112 regarding the "DVD reproduction".

Referring to FIG. 5B, the client 110 combines (or aggregates) a UI A 114 provided by the first server 120 and a UI B 116 provided by the second server 130 to generate the combined UI 112 in operation 144.

If the combined UI 112 generates an event according to a user's input, the UI A 114 and the UI B 116 generate events.

For example, if the combined UI 112 that generates an event "DVD stop" is generated, and a user clicks a UI "DVD stop", a stop event of a DVD with regard to the first server 120 that is the DVD player is generated, and a reproduction stop event of an AV signal with regard to the second server 130 is generated. At the same time, an event of increasing the lighting in the living room with regard to the third server 140 that is the lighting of the living room is generated.

The event combination (or aggregation) described with reference to FIG. 5B, which provides the combined UI 112 that generates an event combination (or aggregating) relating events while maintaining the UIs A and B 114 and 116 provided by the first server 120 and the second server 130, is different from that described with reference to FIG. 5A.

Figure 6:
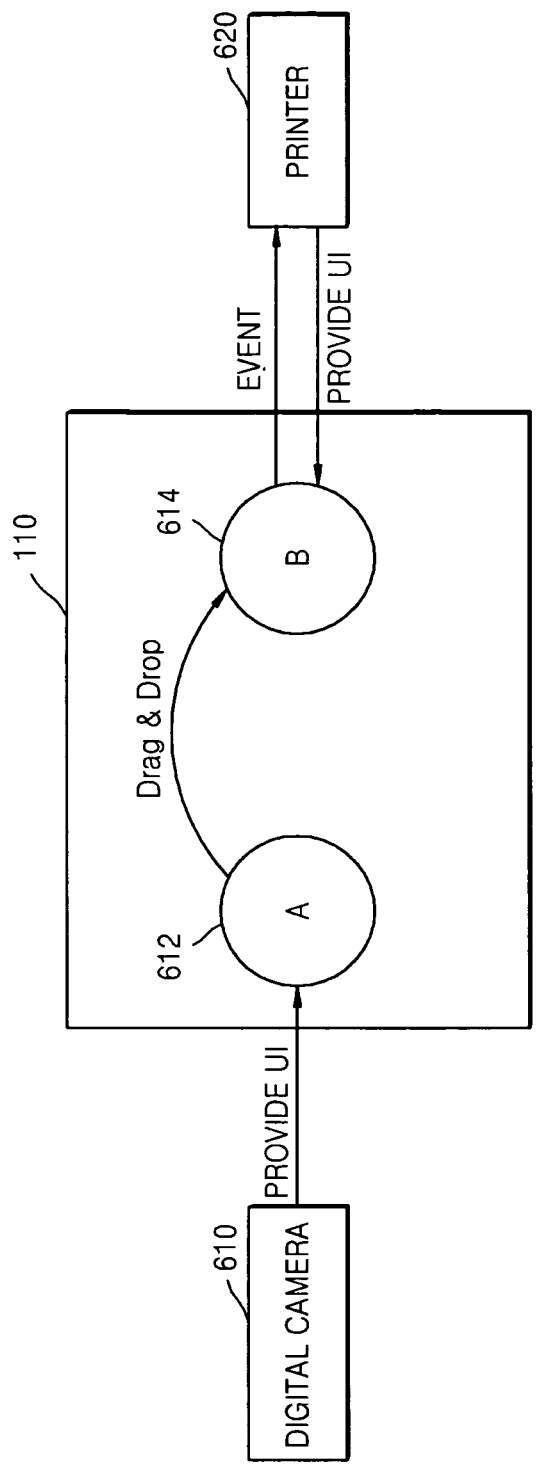
FIG. 6 illustrates an event combination (or aggregation) of UIs according to another embodiment.

FIG. 6 illustrates an event combination (or aggregation) of UIs according to another embodiment. Referring to FIG. 6, a photo of a digital camera 610 is printed through a printer 620 while viewing the photo through the client 110 that is a digital TV.

The client 110 receives UIs from the digital camera 610 and the printer 620 and combines (or aggregates) events. The digital camera 610 provides the client 110 with a UI A 612. The printer 620 provides the client 110 with a UI B 614. The UI A 612 is used to view photos stored in the digital camera 610 through the client 110. The UI B 614 is used to perform a printing job using the printer 620.

The client 110 aggregates the UIs A and B and defines a new event. For example, the client 110 may define an event of printing the photos stored in the digital camera 610 by using the printer 620. If a user moves one of the photos displayed on a screen through the UI A to the UI B by dragging and dropping it, the client 100 may define an event of printing the moved photo by using the printer 620. At this time, photo data that is to be printed may be transmitted from the digital camera 610 to the printer 620 via the client 110, or may be transmitted to the printer 620 from the digital camera 610 without the client 110. In summary, the event of the UI A and the event of the UI B are combined (or aggregated) to generate a combined event that is printing of a photo.

Referring to FIG. 1, in operation 144, the client 110 aggregates the plurality of UIs shown in FIGS. 4A through 6 and generates the combined UI. In operation 146, the client 110 displays the generated combined UI on the screen.

In operation 148, the client 110 accesses the first server 120 and/or the second server 130 according to a user input through the displayed UI.

Figure 7:
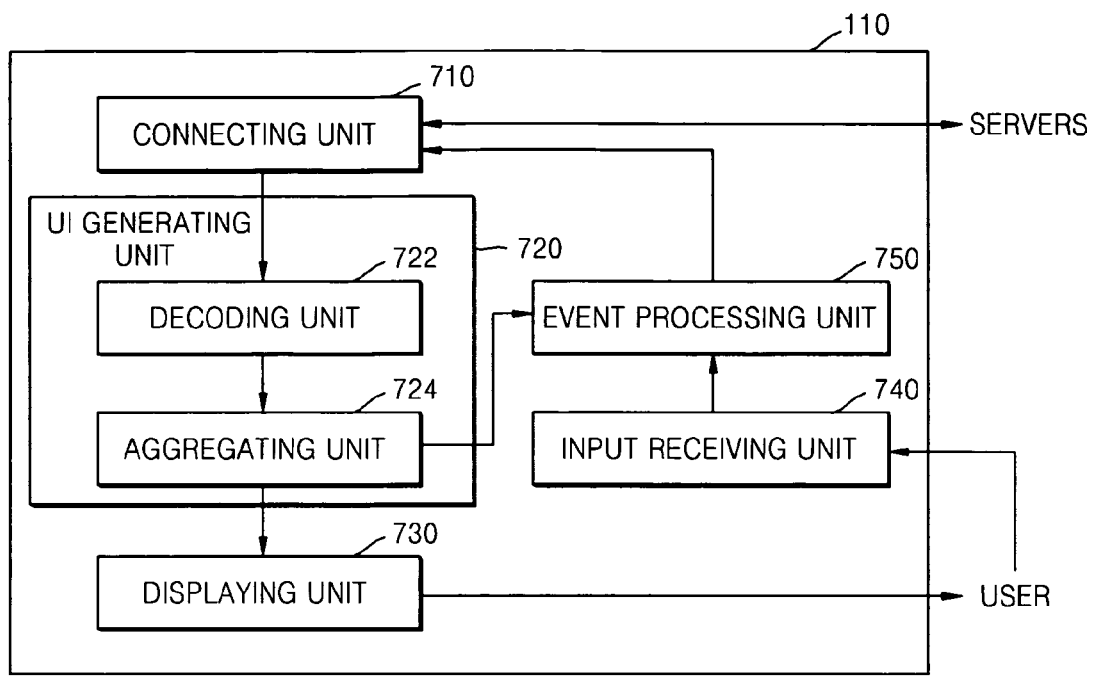
FIG. 7 is a block diagram of a client including a UI generating device according to an embodiment.

FIG. 7 is a block diagram of the client 110 including a UI generating device according to an embodiment. Referring to FIG. 7, the client 110 includes a connecting unit 710, a UI generating unit 720, a displaying unit 730, an input receiving unit 740, and an event processing unit 750. The connecting unit 710 and the UI generating unit 720 correspond to the UI generating device of the present embodiment.

The connecting unit 710 may receive UIs from at least two servers. The connecting unit 710 receives the UIs that are encoded in a multimedia data format from at least two servers. The connecting unit 710 transmits events generated by a user input to at least two servers.

The UI generating unit 720 aggregates (or combines) the at least two UIs received from the connecting unit 710 and generates a combined UI. A decoding unit 722 decodes multimedia data received from the connecting unit 710 and obtains information used to present objects included in UI elements, i.e., the at least two UIs, information about events generated by the objects, and information about functions called to process the events.

An aggregating unit 724 aggregates the at least two UIs based on information obtained from the decoding unit 722 and generates the combined UI. It has been described that the combination (or aggregation) of the at least two UIs is a presentation combination (aggregation), an event combination (aggregation), etc.

The displaying unit 730 displays the combined UI generated by the combining (or aggregating) unit 724 on a screen.

The input receiving unit 740 detects the user input through the combined UI displayed on the screen. The input receiving unit 740 receives the user input through various UI input devices such as a keyboard, a mouse, a touch screen, and the like.

The event processing unit 750 processes the user input received from the input receiving unit 740, i.e., the events of the at least two UIs. The input receiving unit 740 calls functions for processing the events of the at least two UIs. The input receiving unit 740 transmits a message for calling the functions for processing the events to the at least two servers through the connecting unit 710.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of generating a user interface (UI) by a client, the method comprising:
   receiving a plurality of UIs, each UI being encoded in a multimedia format and independently received at the client from plural servers; and
   generating, by the client, a combined UI by combining the received plurality of UIs, based on preference of the client and the received plurality of UIs,
   wherein, the plurality of UIs are also displayed on a different client.

2. The method of claim 1, wherein the plurality of UIs is encoded in a multimedia data format by using an MPEG scene-description technology.

3. The method of claim 2, wherein the plurality of UIs, received from the plural servers, includes information used to present objects included in at least two UIs, information about events generated by the objects, and information about functions called to process the events.

4. The method of claim 3, wherein the generating of the combined UI comprises:
   decoding the plurality of UIs that are encoded in the multimedia data format;
   analyzing the information used to present objects included in the at least two UIs, the information about events generated by the objects, and the information about functions called to process the events with regard to the plurality of decoded UIs; and
   generating the combined UI by combining the plurality of UIs based on a result of the analyzing.

5. The method of claim 4, wherein the generating of the combined UI by aggregating the plurality of UIs based on the result of the analyzing comprises:
   generating the combined UI by disposing the plurality of UIs.

6. The method of claim 4, wherein the generating of the combined UI by combining the plurality of UIs based on the result of the analyzing comprises:
   generating the combined UI so as to generate a combined event by combining at least two events generated by the plurality of UIs.

7. The method of claim 4, wherein the generating of the combined UI
   generating the combined UI so as to generate a combined event related to at least one of the events generated by the plurality of UIs.

8. The method of claim 1, wherein the plurality of UIs is received from at least two widgets.

9. The method of claim 1, wherein the UI package includes UI elements and UI objects,
   wherein each of the different clients selects respective UI elements and UI objects from the UI package, based on the information about capabilities of the plurality of different clients.

10. The method of claim 1, wherein the plurality of UIs are encoded, by the servers, in a UI package, and the UI package includes information about capabilities of the plurality of different clients, and
    wherein the UI package including the information about the capabilities of the plurality of different clients is transmitted from the servers to the plurality of different clients.

11. An apparatus for generating a UI by a processor, the processor comprising:
    a connecting unit to receive a plurality of UIs, each UI being encoded in a multimedia format and independently received at the apparatus from plural servers; and a UI generating unit to generate a combined UI by combining the received plurality of UIs, based on preference of the apparatus and the received plurality of UIs, wherein the plurality of UIs are also displayed on a different apparatus.

12. The apparatus of claim 11, wherein the plurality of UIs is encoded in a multimedia data format by using an MPEG scene-description technology.

13. The apparatus of claim 12, wherein the plurality of UIs, received from the plural servers, includes information used to present objects included in at least two UIs, information about events generated by the objects, and information about functions called to process the events.

14. The apparatus of claim 13, wherein the UI generating unit comprises:
- a decoding unit decoding the plurality of UIs that are encoded in the multimedia data format;
- an analyzing unit analyzing the information used to present objects included in the at least two UIs, the information about events generated by the objects, and the information about functions called to process the events with regard to the decoded UIs; and
- an combining unit generating the combined UI by combining the plurality of UIs based on a result of the analyzing.

15. The apparatus of claim 14, wherein the aggregating unit generates the combined UI by disposing the plurality of UIs.

16. The apparatus of claim 14, wherein the aggregating unit generates the combined UI so as to generate a combined event by combining at least two events generated by the plurality of UIs.

17. The apparatus of claim 14, wherein the aggregating unit generates the combined UI so as to generate a combined event related to at least one of the events generated by the plurality of UIs.

18. The apparatus of claim 11, wherein the plurality of UIs are widgets.

19. The apparatus of claim 11, wherein the UI package includes UI elements and UI objects, wherein each of the different clients selects respective UI elements and UI objects, based on the information about capabilities of the plurality of different clients.

20. A non-transitory computer readable recording medium having recorded thereon a program receiving a plurality of UIs, each UI being encoded in a multimedia format and independently received at a client from plural servers, and generating a combined UI, by the client, by combining the plurality of UIs, based on preference of the client and the received plurality of UIs, wherein, the plurality of UIs are also displayed on a different client.

21. The non-transitory computer readable recording medium of claim 20, wherein the UI package includes UI elements and UI objects, and wherein each of the different clients selects respective UI elements and UI objects, based on the information about capabilities of the plurality of different clients.

* * * * *